B. E. CARRM.
AUTOMOBILE BODY.
APPLICATION FILED APR. 20, 1917.
1,299,426.
Patented Apr. 8, 1919.
4 SHEETS—SHEET 1.
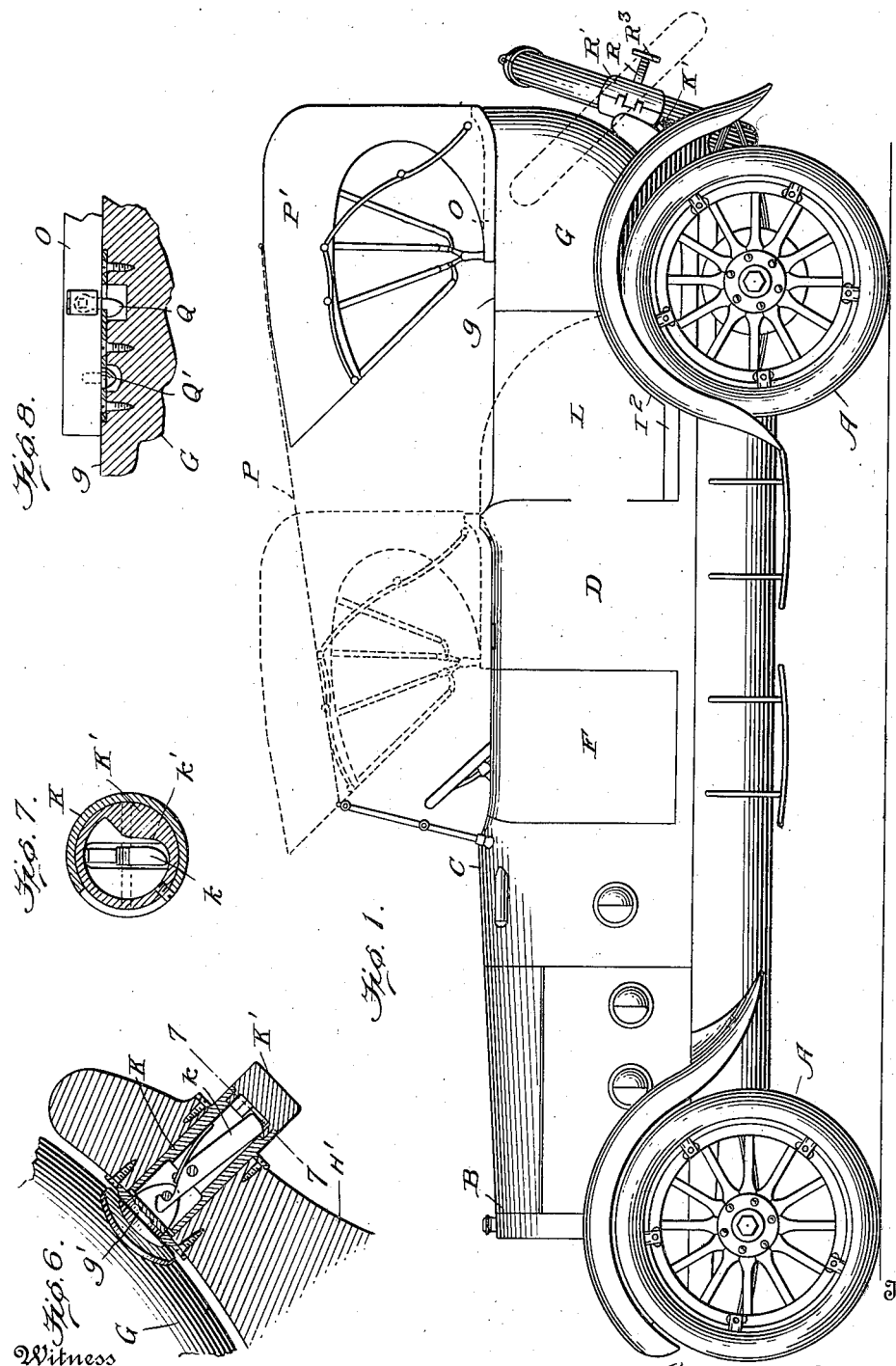

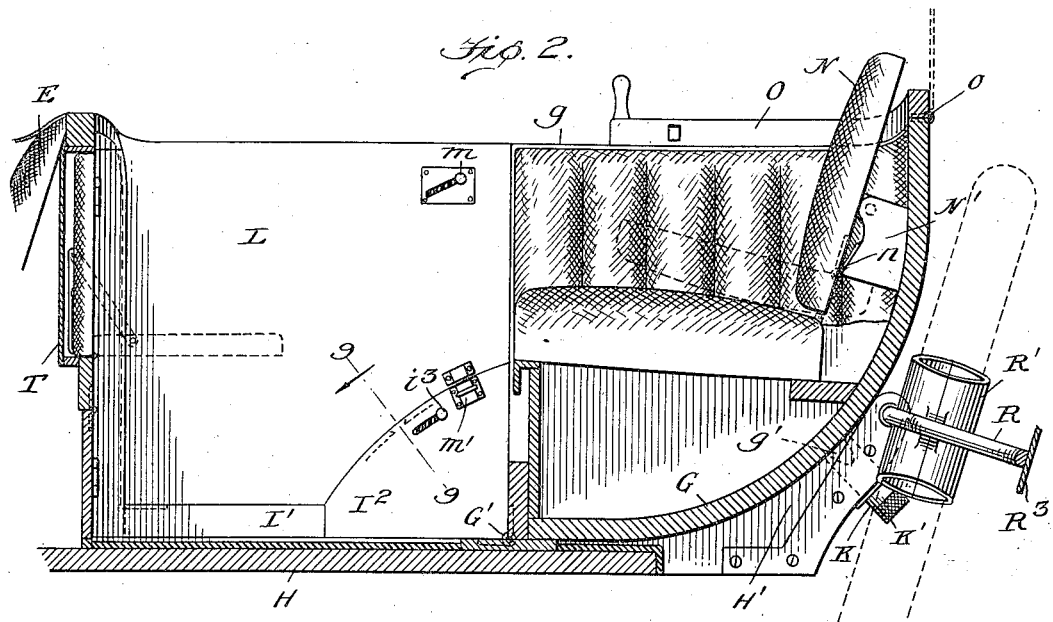
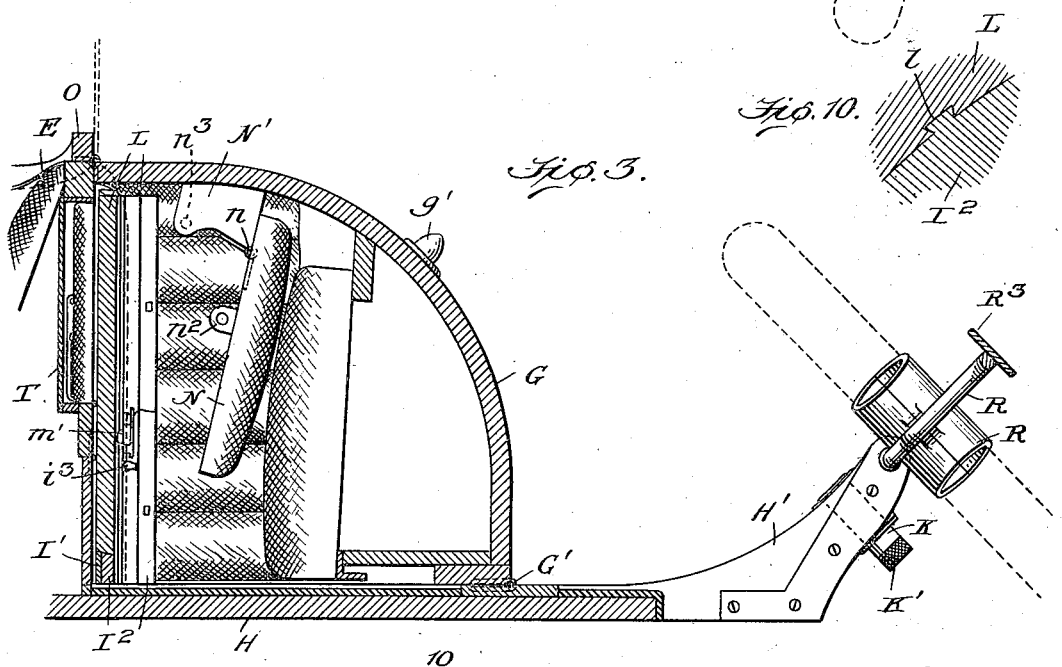

B. E. CARRM.
AUTOMOBILE BODY.
APPLICATION FILED APR. 20, 1917.
1,299,426.
Patented Apr. 8, 1919.
4 SHEETS—SHEET 3.
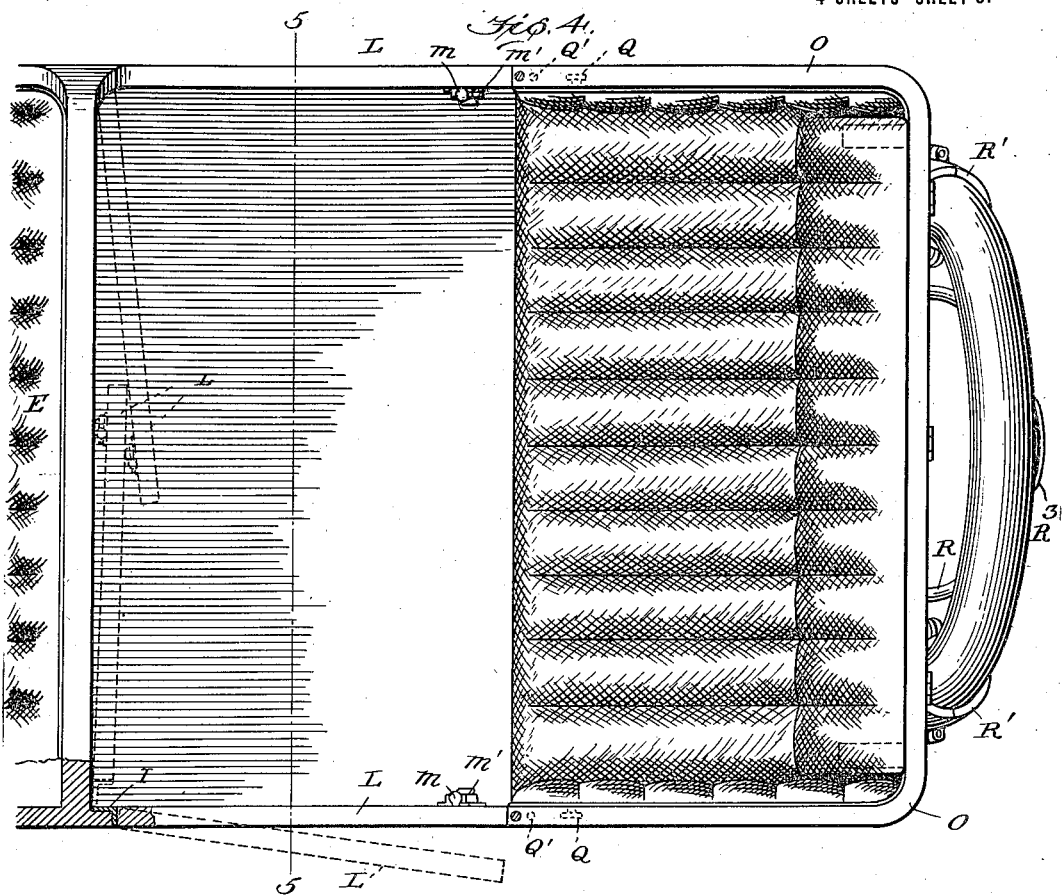
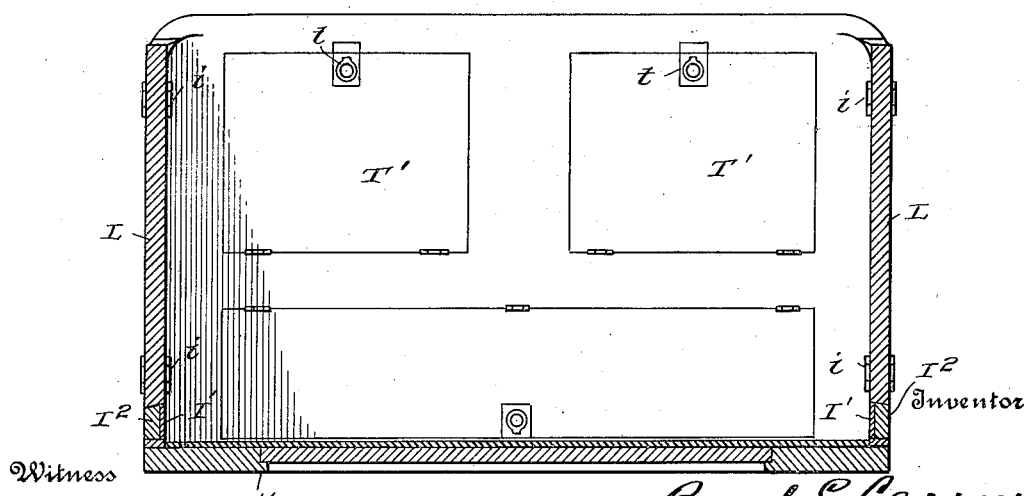

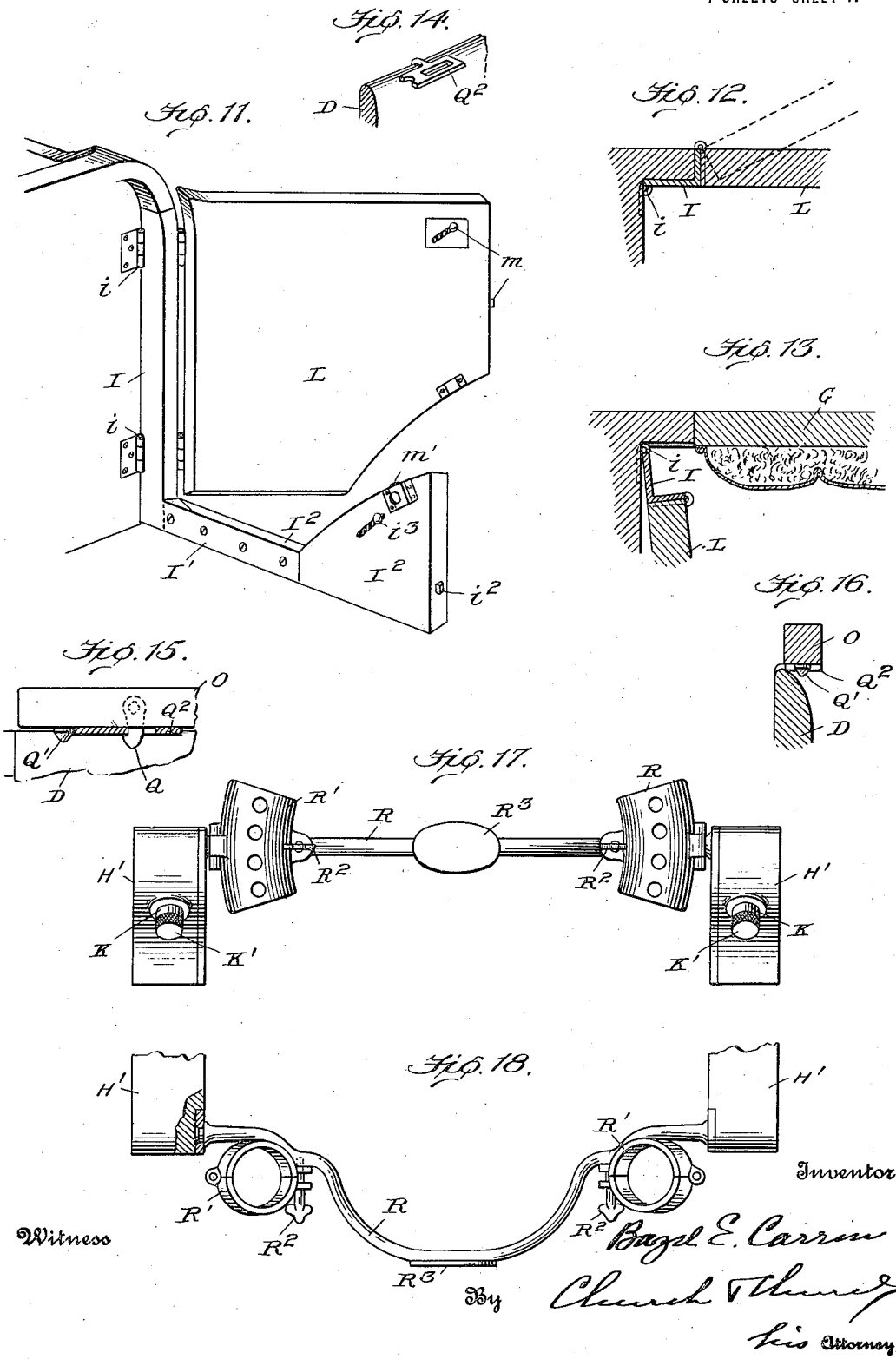

UNITED STATES PATENT OFFICE.

BAZEL E. CARRM, OF ST. LOUIS, MISSOURI, ASSIGNOR TO AMERICAN MOTORS, INC., OF NEW YORK, N. Y., A CORPORATION OF NEW YORK.

AUTOMOBILE-BODY.

1,299,426.      Specification of Letters Patent.      Patented Apr. 8, 1919.

Application filed April 20, 1917. Serial No. 163,517.

*To all whom it may concern:*

Be it known that I, BAZEL E. CARRM, a citizen of the United States, residing at St. Louis, in the State of Missouri, have invented certain new and useful Improvements in Automobile-Bodies; and I do hereby declare the following to be a full, clear, and exact description of the same, reference being had to the accompanying drawings, forming part of this specification.

The present invention relates to automobile bodies for passenger accommodation.

It has long been desirable to provide a structure which would be capable of conversion into either a single-seat runabout type, or into a multiple seat touring car type of vehicle, and many efforts have been made to attain this end. Unfortunately such efforts have not resulted in the production of an acceptable vehicle either because of the inability of the producers to provide a structure which is mechanically competent to withstand the strains to which the body of the vehicle is subjected without exposing the occupants to the danger of collapse, or without racking or loosening to such an extent, after a brief period of use, as to produce body noises which condemn the vehicle as a passenger conveyance. Aside from the foregoing mechanical defects, no vehicle has heretofore been produced which would, when both in the form of a runabout and when in the form of a touring car, present an appearance conforming to accepted lines of beauty and utility, or, in other words, a car which would not give the appearance of a makeshift collapsible or folding structure when it is in one or the other of the forms of vehicle referred to.

The present invention has for its object to overcome all of these difficulties and to provide a vehicle which, when in the form of either a runabout or a touring car, presents an appearance which is strictly in conformity with accepted lines of beauty and utility, as, for example, the well known stream-line form of body which is in vogue at this time, and which, when in either the runabout or touring car form, will have the strength to resist racking or extraordinary strains to practically the same degree as is possessed by bodies of the usual construction. This is especially true in connection with the tonneau or rear passenger space and seats, inasmuch as it is always desirable to afford a maximum factor of safety for persons transported in this portion of the car.

Referring to the accompanying drawings,—

Figure 1 is a side elevation of an automobile embodying the present invention, the structure being shown in full lines as a touring car and in dotted lines as a runabout.

Fig. 2 is a central vertical section through the tonneau or rear passenger compartment of the body, the upper part of the top, forward part of the front seat, and chassis being entirely omitted.

Fig. 3 is a similar section, showing the parts in their folded position or in the position they occupy when the car is converted into a runabout, as shown in the dotted lines in Fig. 1.

Fig. 4 is a top plan view of the parts shown in Fig. 2.

Fig. 5 is a transverse section substantially in a plane indicated by the dotted lines 5—5 in Fig. 4.

Fig. 6 is a detail sectional elevation illustrating the retaining devices for holding the rear seat or tonneau section in the position shown in full lines in Fig. 1 and in Fig. 2.

Fig. 7 is a transverse section in a plane indicated by line 7—7, Fig. 6.

Fig. 8 is a detail sectional elevation showing the top positioning and locking devices.

Fig. 9 is a section in a plane indicated by the line 9—9, Fig. 2.

Fig. 10 is a section in a plane indicated by the line 10—10, Fig. 9.

Fig. 11 is a detail perspective view showing one of the door jamb or brace sections with the door carried thereby.

Fig. 12 is a detail transverse section through the hinge portions of the jamb and door.

Fig. 13 is a similar view with the parts in the position they occupy when the car is in the form of a runabout.

Figs. 14, 15 and 16 are details of the parts for holding the top in position when the car is in the form of a runabout.

Figs. 17 and 18 are a plan and elevation partly in section, of the supporting extensions on the rear portion of the frame, together with the spare tire carrier or holder frame, which is bridged between them.

Like letters of reference in the several figures indicate the same parts.

The chassis, which includes the ground wheels A, engine, etc., together with the running boards, may be of any ordinary or preferred construction, such as is now commonly employed, and the body of the vehicle which is mounted on the chassis embodies in its construction a radiator and hood portion B, preferably conforming to the straight or stream line formation, which has come to be the accepted form of this portion of the vehicle. The front cowl section C, together with the windshield mounted thereon, may also be of conventional form, although in appearance it should harmonize with the radiator and hood section and rear portion of the body to be presently described. Back of the front cowl section the front passenger compartment for the driver and his companion or companions is provided, and this passenger compartment embodies the front seat section D, in which the seat with its usual upholstering E, Figs. 2, 3 and 4, is permanently located at the position usually occupied in the ordinary vehicle. This forward passenger compartment is provided with the usual side doors F, the upper edges of which preferably line up with the side panels of the forward seat section D. The back of the seat section D forms what might, in the touring car form of the vehicle, be called a rear cowl, and the rear edges of the side panels of this front seat section D are adapted to mate either with the rear door jamb sections to be presently described, or with the top edges g of the rear tonneau seat section or turtle-back G. In the preferred construction the rear edges of the panels of the seat section D, together with the upper edges of the tonneau seat section G are of a graceful curvature which will give an upward trend to the back extreme of the tonneau section, and at the same time will permit of the edges of the panels of the section D projecting rearwardly a short distance beyond the plane of the back of the intermediate cowl or back of the seat of the front section. This provides a space between these edges of the panels, and affords room for the doors and jamb sections when they are swung inwardly, for example, as shown in Fig. 4 of the drawings, but without restricting the area of the door opening to an objectionable degree, even though the wheel base of the vehicle is short and the mud guards or fenders of the rear wheels are located well forward, practically the extreme position under these conditions being that shown in Fig. 1.

The base or sill timbers of the body, best seen in Figs. 2 and 3, and indicated at H, extend rearwardly along over the frame members of the chassis, as usual, but at their rear ends are curved upwardly, as shown at H', the line of the curvature substantially conforming to the curvature of the back of the rear seat section G. The rear seat section G is hinged at G' to the bottom or sill members H, or to a suitable strengthening plate forming a part of the sill members, and the location of the axis of the hinge or hinges is such that when the section G is turned forwardly, as shown in Fig. 3 and in dotted lines in Fig. 1, the mating condition of the upper edges g and the rear edges of the panels of the section G exist, but when the section G is turned back to the position shown in full lines in Fig. 1 and in Fig. 2, it will rest against and be supported by the upwardly curved extensions H' of the sill members H, and these sill members are extended upwardly to a point where any backward thrust, due to the weight of the passengers, will be substantially taken directly by the upwardly curved part of the sill members.

As an additional precaution against any possible yielding of the rear seat or tonneau section G under the strains or loads imposed upon it in use, provision is made whereby it will be braced directly from the permanent seat section D, and as a most convenient means for accomplishing this end, the door jamb sections are made of such form as to serve not only as the carrying means for the doors, but also as the bracing means for the rear or tonneau section. This can be conveniently accomplished by providing door jamb sections which fold inwardly and are adapted to turn into position between the side edges of the section D, and the side edges of the section G. The doors themselves are mounted in these jamb sections so as to swing outwardly, thus permitting the entry and exit of passengers which would not be practical if the doors swung inwardly. The jamb sections referred to are formed in part by vertically extending angle irons I hinged at their inner edges at $i$, well within the side panels of the section D, so as to swing inwardly from the position shown in Fig. 12, to the position shown in Fig. 13. At their lower ends the angle irons I, forming the vertical portions of the jamb sections, extend rearwardly, as shown in Fig. 11, forming what might be termed a sill section I', and here the iron portion is combined with a wooden portion $I^2$ which extends rearwardly and is adapted to abut against and interlock with the front edges of the rear section G. Conveniently, this portion $I^2$ is vertically widened so as to form a brace extending a considerable distance up along the edge of the rear section G, as shown in Figs. 2 and 11, and it is interlocked with the said edges by bolts $i^2$ adapted to be released by a handle $i^3$. When the jamb sections are swung from the position shown in dotted lines in Figs. 4 and 13, to the position shown in Figs. 2, 5, 11 and 12, and interlocked with the rear section G, it will be readily seen that a rigid structure is provided which will prevent any looseness or working of the sections with respect to each other, such as would cause body noises, and the structure is one which is well calculated to withstand such strains as those liable to be imposed upon it in the ordinary commercial use of the vehicle.

To insure the proper positioning of the rear or tonneau section G on the sill sections H' and to prevent any relative lateral movement of these parts, the tonneau section is provided with tapered knobs or dowels $g'$, best seen in Figs. 3 and 6, adapted to fit in sockets K in the sill sections H'. The sockets K may conveniently be provided with locks for engaging the dowels $g'$ so that when turned back to form a touring car the tonneau section G will be held firmly in its place. These locks may conveniently be formed by spring latches $k$ adapted to be released by the turning movement of knobs or handle section K' forming extensions of the sockets K. Each knob or handle section K' is provided internally with a cam surface $k'$ for coöperation with the spring latch $k$ when turned in one position and to release the same when turned in the other position, but it is obvious that any other desired form of latch or locking device may be employed, although it is preferred that a conical dowel be employed under all circumstances and that the contacting surfaces between the tonneau section and sill section shall be confined to the metal members or such buffing surfaces as may be interposed between them so as to avoid chafing or marring the finished surface of the turtle-back formed by the curved rear wall of the tonneau section G.

The side doors L are hinged at their edges to the jamb sections I so as to swing outwardly as shown in Figs. 4 and 11, and they may be held in closed position by spring latches of the usual construction indicated at $m$, but it is preferred that provision should be made whereby, when the parts are to be folded, the doors and the jamb sections shall be locked against relative movement, for which purpose a sliding bolt $m'$ is provided which must be positively moved into and out of its locking position.

The upholstering and seat cushion of the tonneau seat are of the usual construction, but it will be noted that when the tonneau section is folded so as to give the body a runabout form, chafing of the side upholstery is prevented because of the fact that the jamb section of the doors are then moved or folded in to the position shown in Fig. 13, and there is, therefore, nothing to come into contact with the upholstery. Furthermore, in order to provide for the comfort of the passengers and afford them a back of sufficient height, it is preferred that the back cushion N shall be hinged at a point near its lower edge, indicated at $n$, in Figs. 2 and 3, to forwardly extending brackets N', such brackets being mounted on the rear wall or frame of the tonneau section, and provision is made whereby the back cushion N may be held in its upright position, as shown in full lines in Fig. 2, or allowed to assume its folding position, shown in dotted lines in that figure, and in full lines in Fig. 3. This holding means may conveniently consist of a clip $n^2$ on the seat back adapted to coöperate with a socket or projection $n^3$ on the bracket N'.

When the doors L are closed it is always desirable that they should be positioned by projections and sockets adapted to relieve the holding bolts of strain, and to conveniently accomplish this end in the present structure, the lower inclined edges of the doors are provided with tapering dove-tail sockets for the reception of correspondingly shaped projections $l$ on the portion $I^2$ of the jamb sections, as best seen in dotted lines in Fig. 2, and in section in Figs. 9 and 10.

Where a top is desired on vehicles of this kind, it is conveniently and preferably mounted on what might be termed a top frame O hinged at its rear edges at $o$ to the upper edge of the section G, and it is curved or made of a shape which conforms to the upper edge of the section as well as substantially to the upper edges of the panels of section D, and consequently when the section G is turned from the position shown in full lines in Fig. 1, to the position shown in dotted lines in that figure, the top frame O may be transposed by simply holding it up as the section G is turned forwardly from one position to the other, and when in its forward position it fits over and becomes a symmetrically arranged top for the runabout form. When the vehicle is in the form of a touring car, and it becomes necessary to protect the passengers in the front compartment, a curtain top may be extended from the top of the windshield back, as shown by the dotted lines P in Fig. 1. The conventional form of top which is indicated by reference letter P' may, of course, be varied to suit the purchaser's or manufacturer's taste, but where a top is employed, it is preferred that a top frame O be used upon which to mount the top, and this top frame is adapted to be locked in either of its positions by suitable spring catches or other form of lock, such as indicated at Q in Fig. 8, and to be positioned by a dowel, such as indicated by Q'. The devices shown in Fig. 8 are those which hold the top in position when the car is in the form of a touring car, and the devices shown in Figs. 14 and 15 hold the top frame in position when it is swung forwardly in converting the vehicle into a runabout, and they differ from those shown in Fig. 8 in that socket brackets $Q^2$ are provided with which the catches and dowels coöperate.

In a vehicle of this character, where provision is made for converting the same into different types, the harmonious appearance, when in either form, is of the utmost importance, and one of the chief difficulties heretofore has resided in the fact that it has been difficult to provide for carrying an extra tire without destroying the harmonious appearance, but, in the present vehicle, this problem has been met to a large degree by providing an extra tire carrier which can be shifted or turned so as to occupy an angle in harmony either with the back of the tonneau when the vehicle is a touring car, or with the turtle-back of the car when it is in the form of a runabout. To accomplish the ends, the spare tire carrier is mounted on a swinging frame R bridged between and serving as an additional brace for the rearwardly and upwardly extending portions of the sill section H'. This swinging frame R is provided with tire holding clamps R' of conventional form adapted to be closed by turnbolts $R^2$ and it also forms the support for the license tag and rear light which may be conveniently attached to a rearward extension $R^3$.

This swinging frame R thus performs a dual function in the machine, for it not only serves to brace the rear ends of the sill section H', but also serves as a support for the extra or spare tire and for the lamp or license attachments, and it may be swung from the position shown in Figs. 1 and 2 to the position shown in dotted lines in Fig. 1 and in Fig. 3, so as to preserve the harmonious aspect of the vehicle as a whole, regardless of whether it is in the runabout or touring car form.

The whole structure, it will be noted, is one in which there are no detachable parts required in order to change the form of the vehicle from one type to another, and each part is adapted to function when it is in place, so as to perform not only efficient mechanical functions, but also to aid and fill out the contour so as to attain that harmony of appearance which is essential for the practical success of a convertible vehicle.

The tonneau or rear passenger compartment, with the construction described, may be of sufficient size to readily adapt the vehicle for accommodation of a greater number of passengers than can be seated on the rear seat. In other words, the vehicle can be made into what is known as a seven-passenger touring car, by the simple provision of supplemental seats of the usual construction, and these supplemental seats are conveniently foldable into pockets or recesses in the intermediate cowl, or back of the front seat. They are, as shown in Figs. 2, 3 and 5, folded into recesses T, and the bottom portions T' of the seats, when folded, close the recesses after the manner of small doors, where they may be held by catches $t$.

When turned down into the position of use, the seats will leave ample room for the knees of the passengers, as is indicated by the dotted line position in Fig. 2. These supplemental seats are, of course, turned up into their folded position when the vehicle is to be converted into a runabout, and the jamb sections and doors are to be folded inwardly to the position indicated in dotted lines in Fig. 4 and Fig. 3.

What is claimed is:

1. A convertible automobile body embodying a front passenger compartment having a permanently located seat and back therefor and a rear passenger compartment formed by a rear seat section hinged in proximity to the floor level at its lower forward edge to fold with its upper side edges against the rear side edges of the back of the seat of the front compartment and its front edges against the floor sills, inwardly folding door jamb sections movable into position to bridge the bottom of the space between the said rear side edges of the back and the front edges of the sides of the rear seat section to form a brace between the same and outwardly opening doors carried by the jamb sections, said jamb sections and doors closing the sides of the rear passenger compartment.

2. A convertible automobile body embodying a front passenger compartment having a seat with permanent back and side panels, and a tonneau section hinged at its lower front edge and having the side edges of the front and top at substantially right angles to each other and the rear wall curved to form a turtle back when folded forwardly, said top edges of the side being adapted to mate with the rear edges of the said side panels, and inwardly folding L-shaped jamb sections adapted to bridge the space between the panels and tonneau section with outwardly opening doors mounted on the upright portions of the jamb sections.

3. A convertible automobile body embodying a front passenger compartment having a permanent seat section, sills extending rearwardly therefrom, and having upwardly projecting extensions at their rear ends, a tonneau seat section hinged at its lower front edge to the sills and resting against and supported by the upwardly projecting extensions of the sills when turned to its rear position and mating with the back of the front seat section when turned to its forward position to form a turtle-back, and L-shaped folding jamb sections bridging the bottom of the side openings between the front seat section and tonneau seat section when the latter is turned back and serving to brace one section by the other and form the front and bottom of the side openings.

4. A convertible automobile body embodying a front passenger compartment having a permanent seat section with side panels and back, a tonneau seat section having relatively fixed sides, back and seat and hinged at its lower front edge at substantially the floor level to fold forwardly, the height of the sides of the tonneau seat section being equal to the distance from the hinge to the side panels of the front seat section at the floor level to, when folded, completely close the side openings, and inwardly folding L-shaped jamb sections forming the bottom and one side of the side openings and outwardly opening doors carried thereby for closing the side openings, when the tonneau seat section is turned to rear or open position, the tonneau seat section when folded forming an inclosure for the rear seat, jamb sections and doors.

5. A convertible automobile body embodying sill timbers having projections extending upwardly at their rear ends, a front seat section mounted in fixed position on said timbers, a rear or tonneau seat section hinged to said timbers at its lower front edge to fold forwardly into a closed position and rearwardly into an open position, interlocking members on the tonneau seat section and upward projections of the sill timbers to support the said seat section when in open position, and a transverse member interposed between the said upward projections of the sill timbers in rear of the tonneau seat section.

6. A convertible automobile body embodying sill timbers having projections extending upwardly at their rear ends, a front seat section mounted in fixed position on said timbers, a rear or tonneau seat section hinged to said timbers at its lower front edge to fold forwardly into closed position and rearwardly into open position, coöperating members on the rear of the tonneau seat section and upward projections of the sill timbers for supporting the tonneau seat section when in open position at a point above the axis of the hinge, and a transverse member interposed between said upward projections of the sill timbers and pivotally mounted to swing into oppositely inclined positions, whereby it may be turned into a forwardly inclined position when the tonneau seat section is folded and into a rearwardly inclined position when the tonneau seat section is unfolded.

7. A convertible automobile body embodying sill timbers having projections extending upwardly at their rear ends, a front seat section mounted in fixed position on said timbers, a rear or tonneau seat section hinged to said timbers at its lower front edge to turn forwardly into folded position and rearwardly into open position, interlocking members on the rear of the tonneau seat section and upward projections of the sill timbers, and locking means for holding said interlocking members in engagement when the tonneau seat section is unfolded.

8. A convertible automobile body embodying sill timbers having projections extending upwardly at their rear ends, a front seat section mounted in fixed position on said timbers, a rear or tonneau seat section hinged to said timbers at its lower front edge to turn forwardly into folded position and rearwardly into open position, and when in open position being supported by the upward projections of the sill timbers at points above the level of the hinge, jamb sections mounted to move into and out of position to bridge the bottom of the spaces between the side walls of the front and tonneau seat sections, whereby said sections are mutually braced through said jamb sections and outwardly opening doors carried by said jamb sections.

9. A convertible automobile body embodying a permanently located front seat section, a rear or tonneau seat section hinged at its lower front edge to turn forwardly into folded position and rearwardly into open position, jamb sections hinged to fold inwardly from positions intermediate the side walls of the front and tonneau seat sections, doors hinged to said jamb sections to open outwardly and independent means for locking the jamb sections and doors in position between the respective seat sections.

10. A convertible automobile body embodying a front seat section, a hinged rear or tonneau seat section adapted to turn forwardly into folded position and rearwardly into open position, jamb sections hinged to turn into line between and coöperating with the side walls of the two seat sections, doors hinged to said jamb sections, means for locking the door and jamb sections together, and independent means for locking the door and jamb sections in position intermediate the walls of the seat sections independently, whereby the jamb sections may be locked and the doors opened independently, or the doors and jamb sections locked together and folded inwardly as a unit.

11. A convertible automobile body embodying a front seat section, a rear or tonneau seat section hinged at its lower front edge to turn forwardly into folded position with its top edges mating with the rear of the front seat section, jamb sections hinged at their vertical edges to the front seat section to fold inwardly, and to turn into position to fill the bottom of the spaces between the walls of the respective seat sections, whereby the latter are braced, doors hinged to the jamb sections at their forward edges to open outwardly, the axes of the jamb sections being located on the inner side and forward of the rear edges of the front seat section whereby, when the jamb sections are folded, clearance is provided for the accommodation of the edges of the tonneau seat section when the latter is folded.

12. A convertible automobile body embodying a permanent front seat section having side panels extending above the level of the seat, a rear or tonneau seat section hinged to fold forwardly against the back of the front seat section, a frame for the vehicle top hinged to the upper rear edge of the tonneau seat section, and coöperating interlocking members on said top frame and side walls of the tonneau seat section and edges of the front seat side panels, whereby said top frame may be locked in position on either one or the other of said seat sections.

BAZEL E. CARRM.